United States Patent [19]
Horiuchi et al.

[11] Patent Number: 5,969,445
[45] Date of Patent: Oct. 19, 1999

[54] BRUSHLESS MOTOR

[75] Inventors: Kazuyoshi Horiuchi; Koji Ando; Shinichi Ohi; Mitsuji Sekiya; Kanta Arai, all of Konan, Japan

[73] Assignee: Zexel Corporation, Tokyo, Japan

[21] Appl. No.: 09/042,619

[22] Filed: Mar. 17, 1998

[30] Foreign Application Priority Data

Mar. 19, 1997 [JP] Japan .................................. 9-085929

[51] Int. Cl.⁶ ........................... H02K 11/00; H02K 11/04
[52] U.S. Cl. ........................ 310/64; 310/68 C; 310/68 R; 360/97.03; 360/98.07; 360/99.08
[58] Field of Search ..................... 310/64, 68 C, 310/68 R, 71, 91; 360/97.03, 98.07, 97.04, 99.08

[56] References Cited

U.S. PATENT DOCUMENTS

| | | | |
|---|---|---|---|
| 3,829,740 | 8/1974 | Beasley | 317/100 |
| 4,554,473 | 11/1985 | Muller | 310/67 R |
| 4,643,653 | 2/1987 | Masaka et al. | 417/417 |
| 4,922,406 | 5/1990 | Schuh | 360/97.03 |
| 5,175,613 | 12/1992 | Barker, III et al. | 257/713 |
| 5,424,887 | 6/1995 | Schuh | 360/97.03 |
| 5,589,711 | 12/1996 | Sano et al. | 257/718 |
| 5,659,297 | 8/1997 | Tatavoosian | 340/815.4 |
| 5,783,881 | 7/1998 | Best et al. | 310/68 C |
| 5,818,133 | 10/1998 | Kershaw et al. | 310/67 R |

FOREIGN PATENT DOCUMENTS 2-139473  11/1990  Japan .

Primary Examiner—Nestor Ramirez
Assistant Examiner—Tran N. Nguyen
Attorney, Agent, or Firm—Wenderoth, Lind & Ponack, L.L.P.

[57] ABSTRACT

A brushless motor which includes an arrangement to prevent dielectric breakdown of electronic parts mounted on a control board. The breakdown is caused by a heat sink which becomes electrostatically charged. The potential at the heat sink, which contacts switching devices (for instance, FETS) of the brushless motor, is equalized with the potential at one side of a source line for a drive circuit formed on the control board that includes the switching device. As a result, when the heat sink becomes electrostatically charged, the charge at the heat sink can be discharged to the source line, thereby eliminating the above problem.

9 Claims, 5 Drawing Sheets

BRUSHLESS MOTOR

BACKGROUND OF THE INVENTION

The present invention relates to a brushless motor that is mainly employed as an air blower in an air conditioning system for vehicles.

Brushless motors in the prior art include the one disclosed in Japanese Unexamined Utility Model Publication No. H2-139473. This brushless motor is provided with a rotatable rotor having field magnets, a stator that generates a rotating magnetic field for the rotor and a means for excitation that excites the stator. Thus, in this brushless motor, a rotating magnetic field is generated by sequentially exciting a plurality of arc-shaped end portions at the stator in the direction of the radius with the means for excitation, and the rotor rotates as the magnets provided at the rotor are repeatedly attracted and repulsed relative to the rotating magnetic field.

In this brushless motor, the means for excitation is constituted of an exciting coil wound around the stator core and a means for switching that controls the direction of the current running to the exciting coil. Normally, a plurality of field effect transistors (FETs) are employed to constitute the means for switching. These FETs control the direction of the current running to the exciting coil by controlling the signal applied to the gate terminal of each FET. Since a relatively large current is handled by the FETs, generating a great deal of heat, often reaching up to approximately 150° C., the FETs are provided with a heat sink. Under normal circumstances, such a heat sink will be constituted of aluminum or an aluminum alloy to ensure that the desired thermal conductivity, weight and so forth are achieved and because of the ease with which heat sinks can be formed using these materials.

However, when the brushless motor described above is mounted at an air conditioner control apparatus for vehicles that is operated in a cold area or the like, dry snow and dust particles that are drawn in along with the outside air through the external air induction port of the vehicle may become electrically charged due to friction generated at the fan of the brushless motor. These charged particles then come in contact with the heat sink exposed through the case housing to electrostatically charge the heat sink. If the voltage resulting from this static electricity reaches approximately 7 KV, it may be discharged to the field effect transistor on the control board, destroying the FET since the typical withstand voltage of a FET is approximately 5 KV.

SUMMARY OF THE INVENTION

Accordingly, an object of the present invention is to provide a brushless motor that prevents dielectric breakdown of electronic parts provided on the control board caused by an electrostatically charged heat sink.

Thus, the brushless motor according to the present invention comprises a rotating shaft, a rotor secured to the rotating shaft, a plurality of magnets provided at the internal circumferential surface of the rotor, a stator that generates a rotating magnetic field for the magnets, an exciting coil wound around the stator, a control board that is mounted with a drive circuit having a plurality of means for switching that switches the direction of the current supplied to the exciting coil as necessary, a case housing that houses the control board and a heat sink comprising a contact portion that comes in contact with a plurality of means for switching and a heat discharge portion that is exposed from the case housing. In this brushless motor, a means for potential equalization that sets the potential at the heat sink equal to one side of the source line for the drive circuit is provided on the control board.

As a result, since the potential at the heat sink that comes in contact with the means for switching is set equal to one side of the source line of the drive circuit formed on the control board that includes the means for switching, with the means for potential equalization, a discharge can be made to the source line even when the heat sink becomes electrostatically charged to achieve the object described above. In particular, when adopted in an air conditioning system for vehicles with its source line constituted of a battery source with a low impedance, the object described above is achieved as long as a potential equal to that at either the plus side or the minus side of the source line is achieved.

In addition, in more specific terms, the means for potential equalization may be constituted of a shorting line between the heat sink and one side of the source line mounted at the control board, and moreover it is desirable to constitute the means for potential equalization with a spring terminal mounted at the heat sink and a contact surface connected to one side of the source line mounted at the control board, with which the spring terminal comes in contact when the heat sink is mounted.

Alternatively, the means for potential equalization may be constituted of a spring terminal, one end of which is secured to one side of the source line provided on the control board with the other end located in contact with or near the heat sink, with one of the plurality of means for switching constituted of a field effect transistor and the drain of the field effect transistor directly connected to the heat sink, or it may be constituted of a terminal mounted at the heat sink together with the means for switching.

Furthermore, the means for potential equalization may be constituted, instead, by placing the leg of an electronic part mounted on the control board near the heat sink, or by providing a discharge terminal that extends from one side of the source line on the control board to the vicinity of the heat sink, to constitute a spark gap that is capable of performing discharge when the heat sink has reached a specific potential with the leg of the electronic part or the discharge terminal.

Moreover, the means for potential equalization may be constituted by forming the case housing with a material having a resistance value such that allows the quantity of electrostatic charge at the heat sink to be maintained at or below a specific maximum value and connecting the case housing with one side of the source line on the control board via the hub portion that extends out from the case housing toward the control board.

BRIEF DESCRIPTION OF THE DRAWINGS

The above and other features of the invention and the concomitant advantages will be better understood and appreciated by persons skilled in the field to which the invention pertains in view of the following description given in conjunction with the accompanying drawings which illustrate preferred embodiments. In the drawings.

DETAILED DESCRIPTION OF THE PREFERRED EMBODIMENTS

Figure 1:
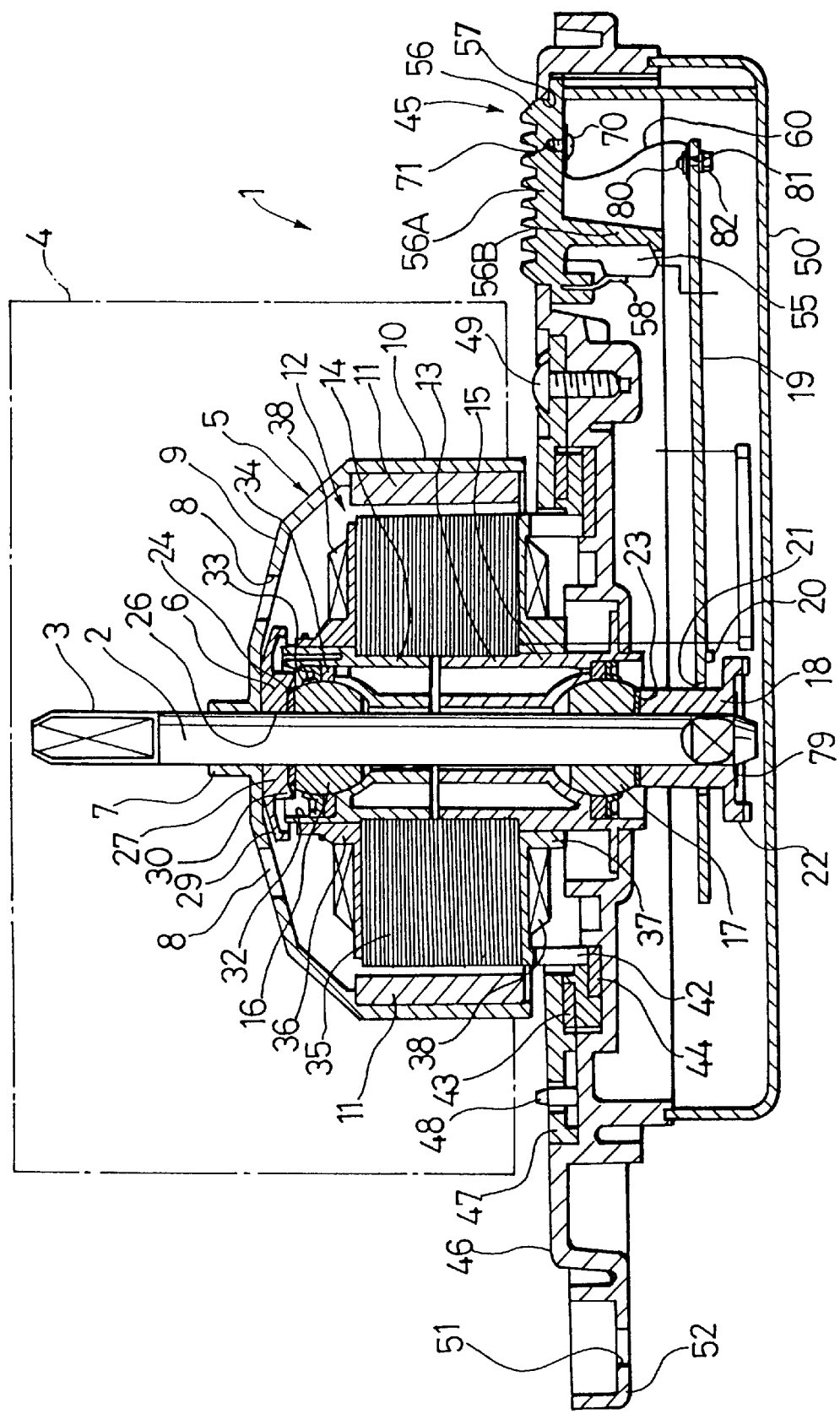
FIG. 1 is a cross section of the brushless motor in the first embodiment of the present invention.

The following is an explanation of preferred embodiments of the present invention with reference to the drawings. A brushless motor 1 illustrated in FIG. 1, which may be employed in an air blower of an air conditioning system for vehicles, for instance, comprises a rotating shaft 2 to which a scirocco type fan 4 is secured, a rotor 5 which is secured to the rotating shaft 2, a stator 12 that generates a rotating magnet field for the rotor 5, a control board 19 onto which an excitation circuit that supplies an exciting current to the stator 12 is wired and a case housing 45 that houses the control board 19.

The case housing 45 is constituted of an upper case member 46, a lower case member 50 that constitutes a second case and a lid body 47, with the control board 19 provided inside. In the upper case member 46, a mounting portion 52 having a screw hole 51 for mounting the brushless motor 1 and an opening portion 57 through which a heat sink 56 is exposed. A plurality of field effect transistors (FETs) 55 (normally 6 FETs are provided) that constitute means for switching the power supply to the exciting coil 38 wound around the stator 12, are formed with the heat sink. It is to be noted that the upper case member 46 and the lid body 47 constitute a first case, whereas the lower case member 50 constitutes the second case.

The rotating shaft 2 is held rotatably by bearings 16 and 17. The bearings 16 and 17 are secured to upper and lower bearing holders 14 and 15 that are mounted at a through hole 13 that passes through the center of the stator 12 by a bearing stopper 33 together with an oil-saturated felt 34 that is in contact with the bearings 16 and 17. In addition, at the lower end of the rotating shaft 2, a sensor magnet 18 that indicates the positions of permanent magnets 11 at the rotor 5 is pressed in and held by a push nut 79 in the axial direction of the rotating shaft 2 so that the distance between the sensor magnet 18 and a plurality of Hall elements 20 provided at the control board 19 is maintained constant.

The sensor magnet 18 is mounted in the rotating shaft 2 by passing through an opening portion 21 formed at the control board 19. The sensor magnet 18 has a flange portion 22 formed at an end portion of the sensor magnet 18 and expanding in the direction of the radius below the control board 19 and the plurality of Hall elements 20 provided at positions facing opposite the flange portion 22 at the rear side of the control board 19. In addition, these Hall elements 20 accurately detect the positions of the permanent magnets 11 at the rotor 5 by detecting the magnetism of the sensor magnet 18. And, based upon the results of this detection, the excitation circuit provided at the control board 19 generates a rotating magnetic field at the stator 12. It is to be noted that between the sensor magnet 18 and the bearing 17, a washer group 23 constituted of a plurality of washers is provided to reduce the sliding resistance between the sensor magnet 18 and the bearing 17.

The rotating shaft 2 is provided with an interlocking end portion 3 for securing the fan 4 at its upper end, the upper end and the rotor 5 is secured below the upper end and in the vicinity of the interlocking end portion 3. The rotor 5 includes a hub portion 7 which is pressed in and secured to the rotating shaft 2, an umbrella portion 9 which expands from the hub portion 7 in an umbrella shape having a plurality of ventilation holes 8, a cylindrical portion 10 that extends out from the outermost circumferential edge of the umbrella portion 9 downward and a plurality of magnets 11 provided at the internal circumferential side surface of the cylindrical portion 10.

A thrust stopper 6 holds the rotor 5 in the axial direction and reduces the sliding resistance at the thrust stopper 6 with a washer 24 provided between the bearing 16 and itself. The thrust stopper 6 includes through hole 26 through which the rotating shaft 2 passes, a cylindrical portion 27 where the through hole 26 is formed, and a circumferential wall 29 that widens from the upper end of the cylindrical portion 27 along the umbrella portion 9 of the rotor 5 in the radial direction so as to extend out and downward over a specific width from the circumferential edge. Moreover, at the lower end surface of the cylindrical portion 27, an oil guide 30 gradually inclines from the sliding contact surface where the cylindrical portion 27 slides in contact with the washer 24 downward toward the outside in the direction of the radius.

An upper end portion 32 of the bearing holder 14 is located in the space between the oil guide 30 and the circumferential wall 29 to return the lubricating oil dripping from the oil guide 30 to the felt 34 with a high degree of reliability and to prevent dust particles from the outside from becoming adhered to the bearing 16.

The stator 12 is constituted of a stator core 35 which, in turn, is constituted of a core formed by laminating silicon steel plate over a plurality of stages, an upper insulating cover 36 and a lower insulating cover 37 that are mounted to clamp the stator core 35 from above and below and the exciting coil 38 which is wound around the stator core 35 which is insulated by the upper and lower insulating covers 36 and 37.

In addition, the lower insulating cover 37 is provided with a leg portion 42 with the front end of the leg portion 42 clamped and held by elastic members 43 and 44 and also clamped and secured between the upper case member 46 and the lid body 47 constituting the case housing 45. With this, the stator 12 is secured to the case housing 45 and the bearing holders 14 and 15 are secured at the through hole 13 of the stator 12, so that the rotating shaft 2 is provided erect and rotatable relative to the case housing 45. It is to be noted that the lid body 47 is positioned by a pin 48 and is secured by a screw 49.

In the brushless motor structured as described above, the heat sink 56 is constituted of a contact portion 56B with which the FETs 55 constituting the means for switching are placed in contact through a plate spring 58 and a heat discharge portion 56A which is provided continuous to the contact portion 56B to constitute an integrated unit and is exposed through the opening portion 57 of the case housing 45. In order to equalize the potential at the heat sink 56 to that at one side of the source line (either at the plus side (anode) or the minus side (cathode)) provided on the control board 19, the heat sink 56 and the source line are connected by a shorting line 60. In the first embodiment, one end of the shorting line 60 is retained at the heat sink 56 by interlocking a screw 70 at a screw hole 71, with the other end of the shorting line 60 retained at one side of the source line on the control board 19 by interlocking a screw 80 at a nut 82 via a through hole 81 that passes through one side of the source line on the control board 19.

Figure 2:
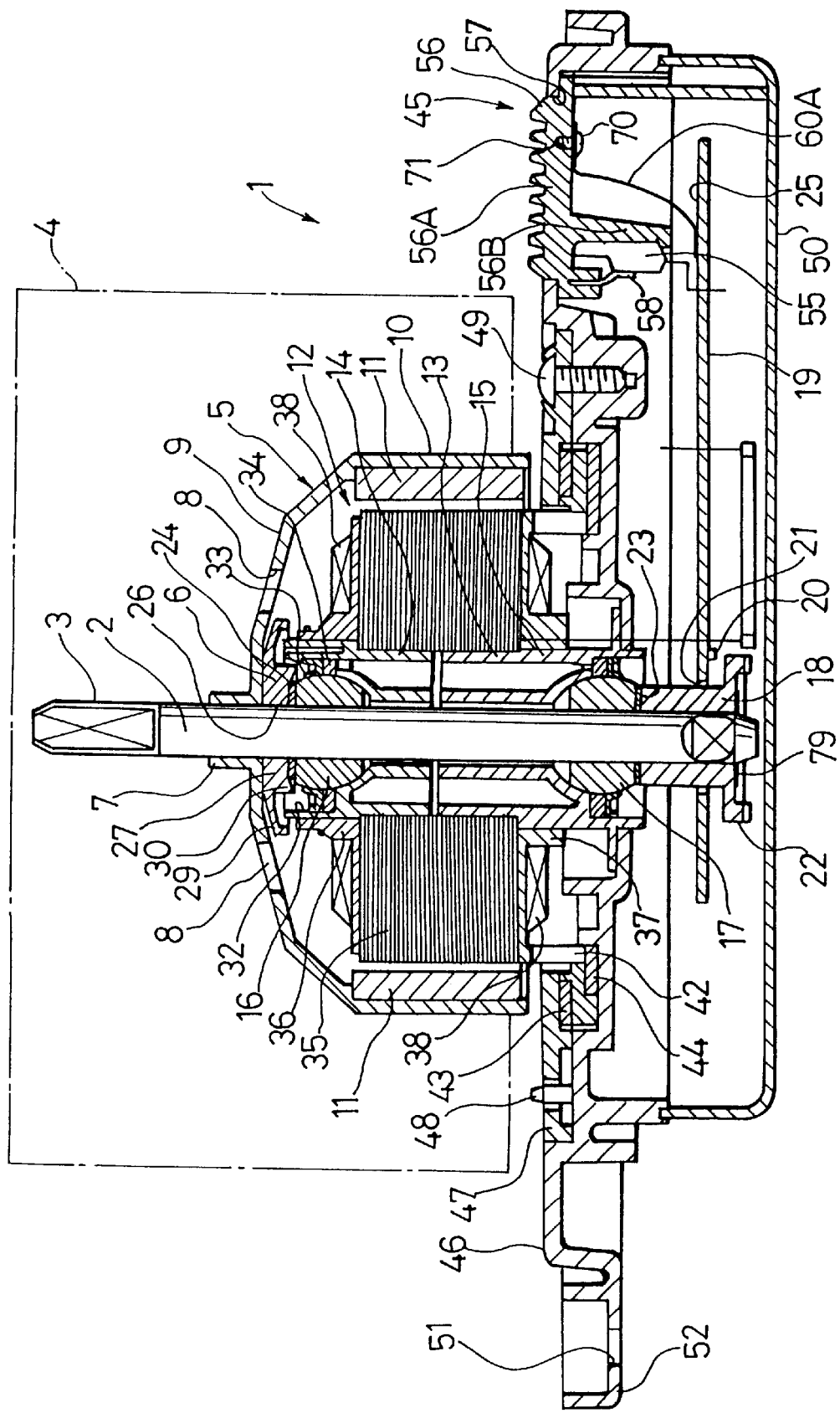
FIG. 2 is a cross section of the brushless motor in the second embodiment of the present invention.

In addition, in a second embodiment which is illustrated in FIG. 2, a spring terminal 60A is secured to the heat sink 56 and a contact surface 25 which is connected with one side of the source line is formed at a position on the control board 19 at which the spring terminal comes in contact so that when the heat sink 56 is mounted at the control board 19, the spring terminal automatically contacts the contact surface 25 on the control board 19. It is to be noted that in the second embodiment and the subsequent embodiments, the same reference numbers are assigned to portions that are identical to and achieve similar advantages to those in the first embodiment and that their explanation is omitted.

Figure 3:
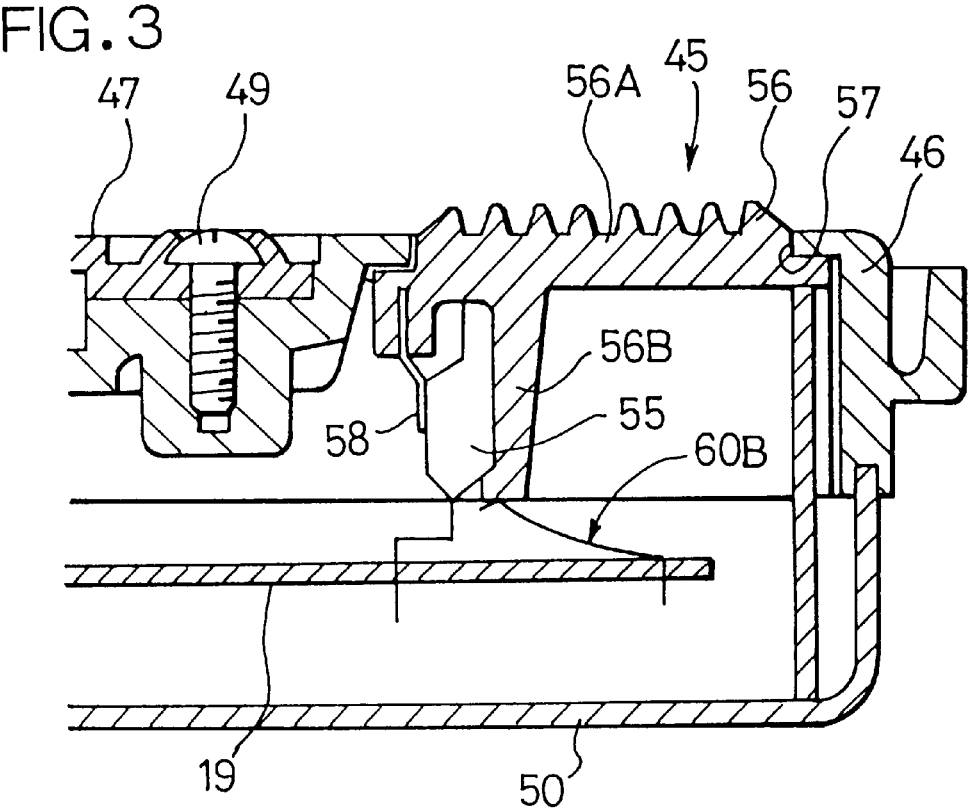
FIG. 3 is a partially enlarged cross section of the brushless motor in the third embodiment of the present invention.

In the third embodiment illustrated in FIG. 3, a spring terminal 60B is structured as a reverse of the spring terminal 60A in the second embodiment, with its one end secured to one side of the source line on the control board 19. The other end of the spring terminal 60B is in contact with the lower end of the heat sink 56 to equalize the potential at the heat sink 56 to that at the one side of the source line.

Figure 4:
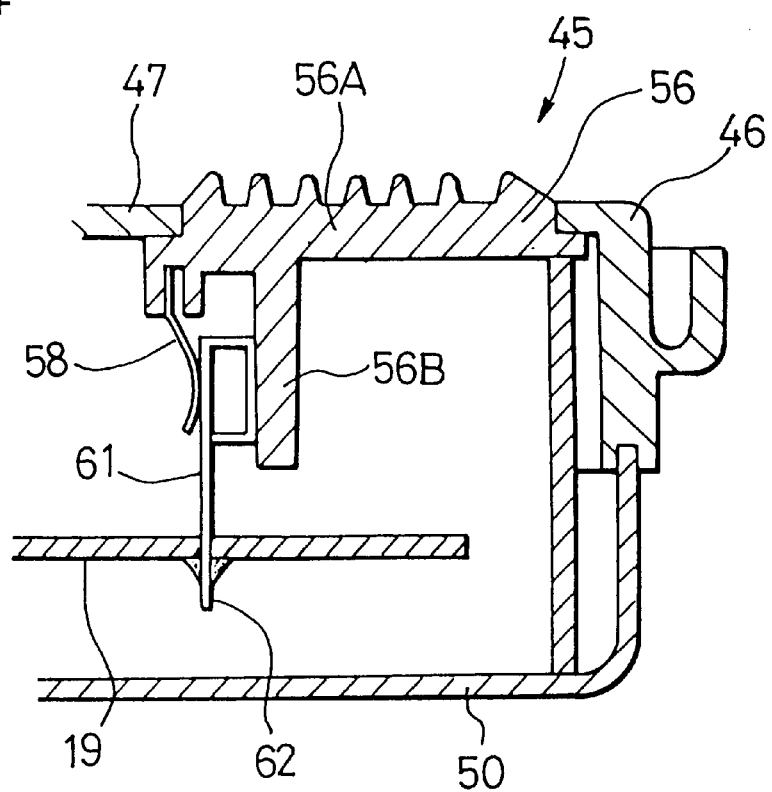
FIG. 4 is a partially enlarged cross section of the brushless motor in the fourth embodiment of the present invention.

In the fourth embodiment illustrated in FIG. 4, a shorting terminal 61 is provided beside the FETs 55, which constitute the means for switching, and is secured to the heat sink 56 together with the FETs 55. One end of the shorting terminal 61 is secured through soldering to one side of the source line provided on the control board 19.

In addition, in the fifth embodiment, the drain of one of the FETs 55 (normally there are 6 FETs) is directly connected to the heat sink 56 to equalize the potential at the heat sink to that at one side of the source line (at the plus side in this case). It is to be noted that the other FETs 55 are insulated from the heat sink with a resin or the like.

Figure 5:
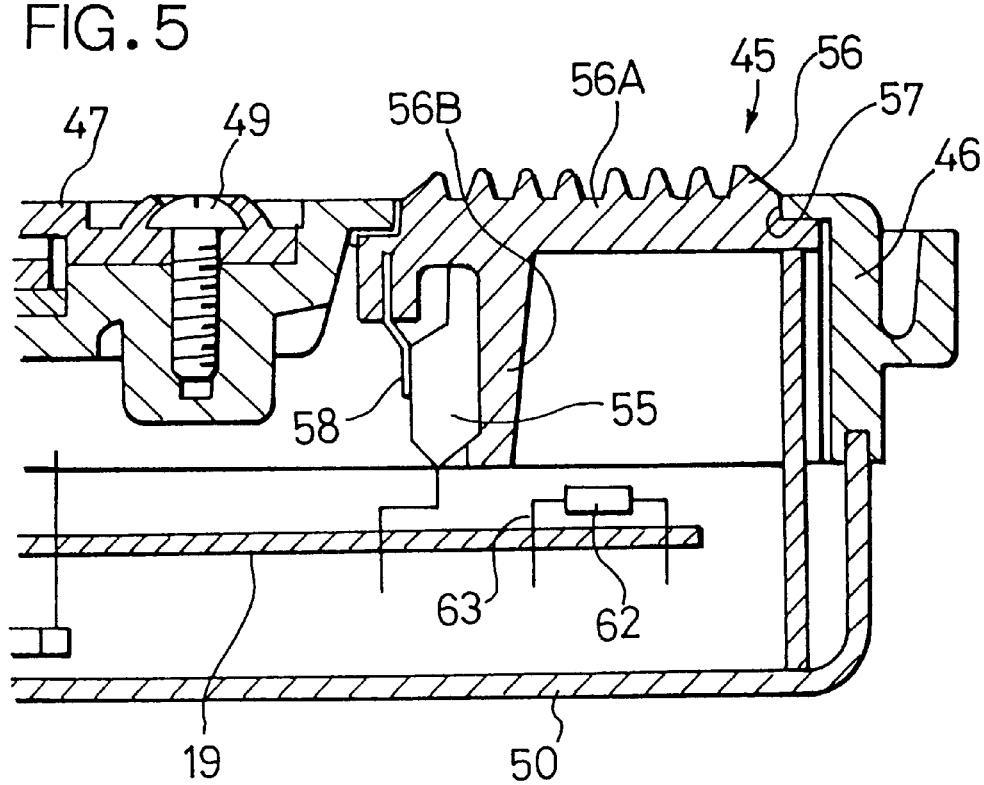
FIG. 5 is a partially enlarged cross section of the brushless motor in the sixth embodiment of the present invention.
Figure 6:
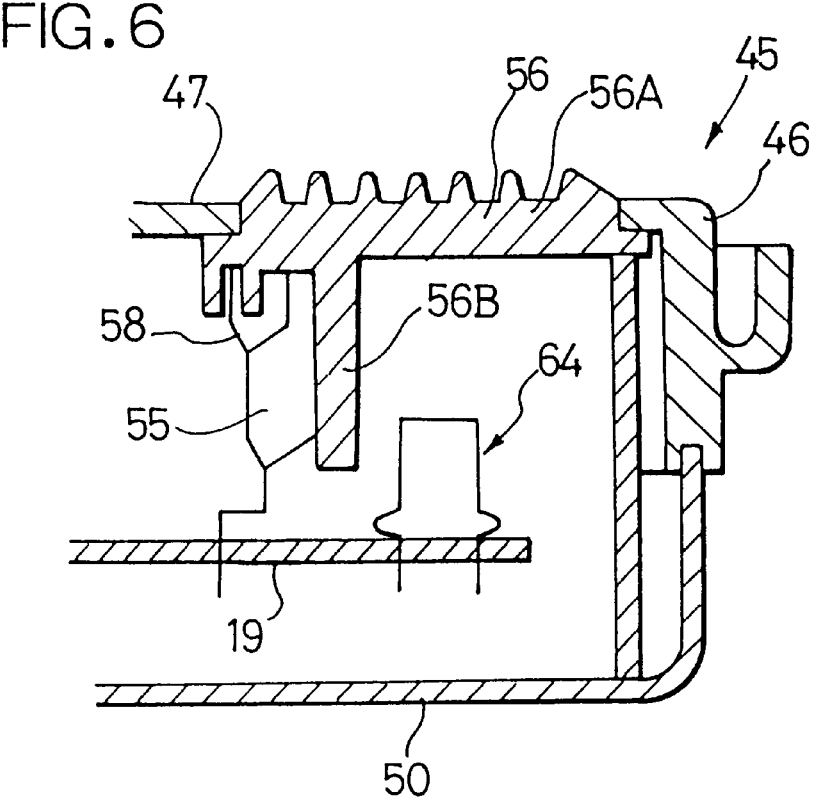
FIG. 6 is a partially enlarged cross section of the brushless motor in the seventh embodiment of the present invention.

In the sixth and seventh embodiments illustrated in FIGS. 5 and 6 respectively, a member that functions as a spark gap is provided near the heat sink 56. In the sixth embodiment in FIG. 5, a leg portion 63 of an electronic part 62 (a resistor, a capacitor or the like) provided on the control board 19 is placed at a position that is separated from the heat sink 56 over a specific distance, and when the difference between the potentials at the heat sink 56 and the source line reaches or exceeds a specific value, a discharge occurs from the heat sink 56 to the leg portion 63 of the electronic part 62.

In the seventh embodiment illustrated in FIG. 6, a special discharge terminal 64 that extends out from one side of the source line on the control board 19 to the vicinity of the heat sink 56 is provided so that when the potential at the heat sink 56 reaches or exceeds a specific value, a discharge will occur to equalize the potential. It is to be noted that if the front end of the spring terminal 60A or 60B in the second or third embodiment illustrated in FIGS. 2 or 3 is distanced from the contact surface 25 or from the front end of the heat sink 56, similar advantages are achieved as those achieved in these embodiments.

Figure 7:
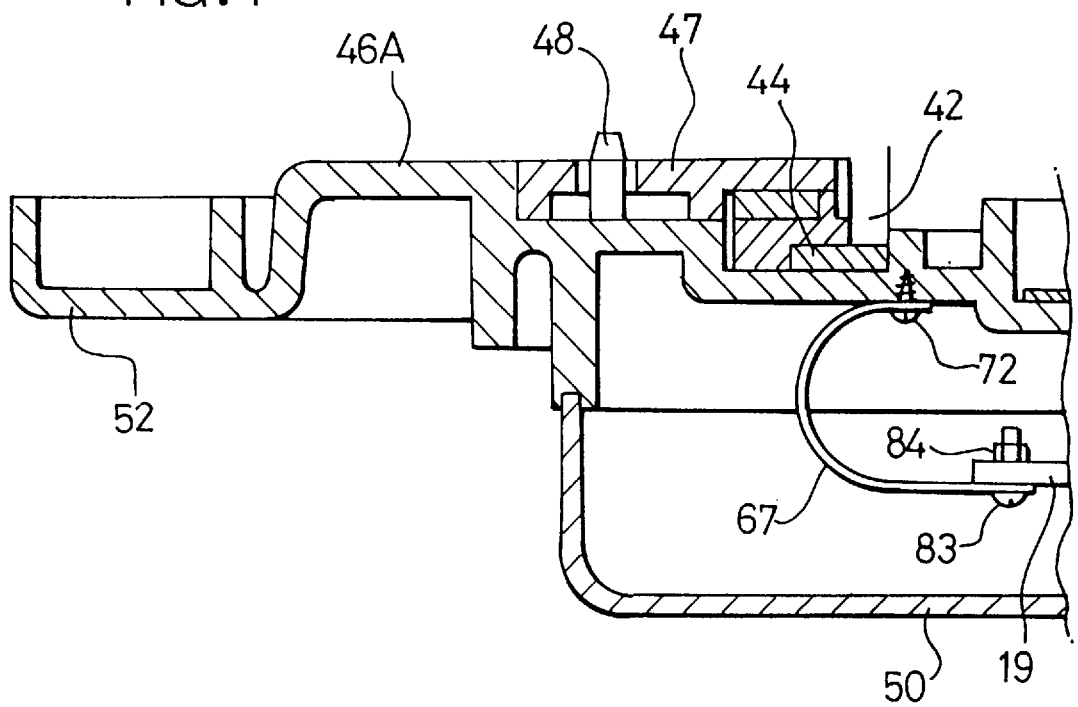
FIG. 7 is a partially enlarged cross section of the brushless motor in the eighth embodiment of the present invention.
Figure 8:
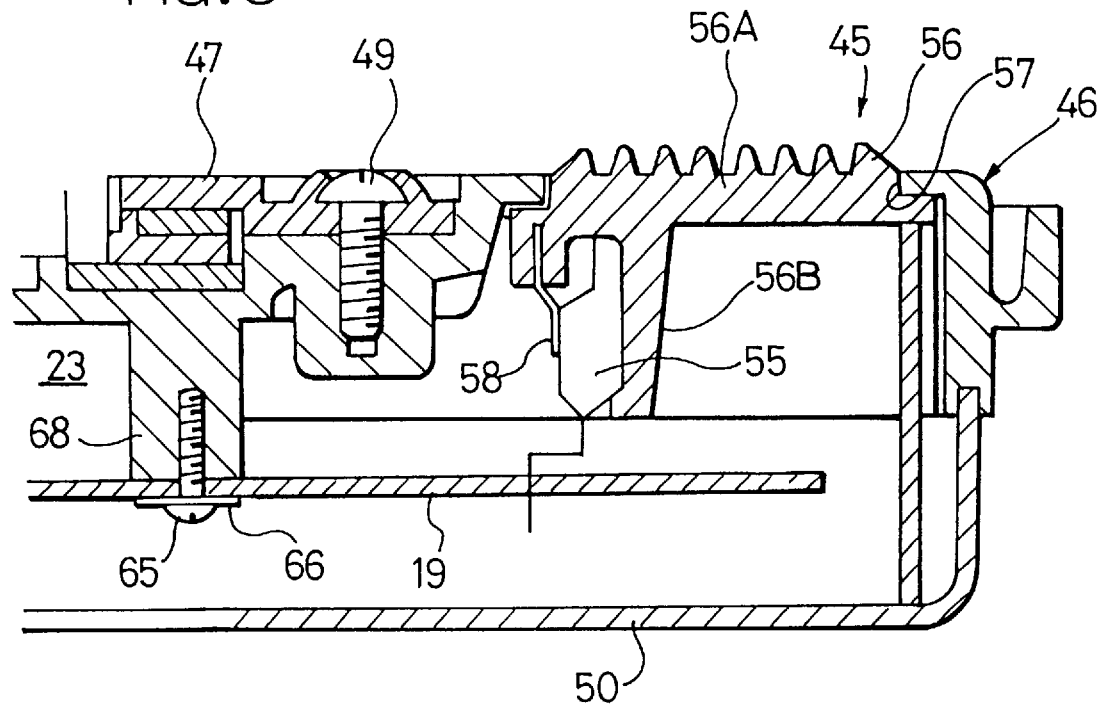
FIG. 8 is a partially enlarged cross section of the brushless motor in the ninth embodiment of the present invention.

In the eighth and ninth embodiments illustrated in FIGS. 7 and 8 respectively, the case housing 45, and in particular, its upper case member 46, is constituted of a material having a resistance value with which the quantity of the electrostatic charge at the heat sink 56 can be maintained at a specific value or lower, with the upper case member 46 connected to one side of the source line on the control board 19. With this, when the heat sink 56 becomes electrostatically charged, the charge at the heat sink 56 will escape to the one side of the source line via the upper case member 46, thereby equalizing the potential at the heat sink 56 with the potential at one side of the source line. It is to be noted that in the eighth embodiment illustrated in FIG. 7, the upper case member 46 and one side of the source line are connected through a shorting line 67. A screw 72 connects one end of the shorting line 67 to the upper case member 46 and a screw 83 and a nut 84 that connect the other end of the shorting line 67 to the one side of the source line on the control board 19.

Moreover, in the ninth embodiment illustrated in FIG. 8, a hub portion 68 that extends out from the upper case member 46 onto the control board 19 and a screw 65 directly connects one side of the source line provided on the control board 19 to the hub portion 68.

As has been explained, according to the present invention, since the electrical charge that builds up in the heat sink caused by dry snow and dust particles containing static electricity blown through by the fan can be discharged to the source line in order to equalize the potential at the heat sink with the potential at one side of the source line for the drive circuit provided on the control board, dielectric breakdown of the FETs constituting the means for switching and damage to the electronic parts caused by static electricity flowing through the FETs can be prevented, thereby achieving stable operation of the brushless motor.

What is claimed is:

1. A brushless motor comprising:

a casing;

a stator secured on said casing and having an exciting coil;

a rotating shaft rotatably mounted in said casing and extending through said stator, said rotating shaft projecting from said casing;

a rotor having a hub portion secured on said rotating shaft, an umbrella portion spreading outwardly from said hub portion, a cylindrical portion depending from an outer circumferential edge of said umbrella portion, and a plurality of magnets disposed along an inner peripheral surface of said cylindrical portion, wherein said rotor is located so as to cover said stator;

a control board disposed in said casing;

a circuit and power source lines for supplying current to said circuit arranged on said control board, wherein said circuit includes a plurality of switching means for switching the direction of an electric current supplied to said exciting coil;

a fan secured on an end portion of said rotatable shaft; and a heat sink secured to said casing and provided with a contact portion and a heat discharge portion, wherein said switching means contacts said contact portion, and said heat discharge portion is exposed to the exterior of said casing at a location adjacent to said fan;

an electric discharge terminal extending from one of said power source lines to the vicinity of said heat sink, wherein said electric discharge terminal is spaced, by a predetermined distance, from said heat sink so that static electricity charged in said heat sink will discharge to said electric discharge terminal.

2. A brushless motor as claimed in claim 1, wherein said electric discharge terminal is a leg of an electronic part positioned on said control board and located adjacent to said heat sink.

3. A brushless motor as claimed in claim 2, wherein said one line of said power source lines is an anode line.

4. A brushless motor as claimed in claim 2, wherein said one line of said power source lines is a ground line.

5. A brushless motor as claimed in claim 1, wherein said one line of said power source lines is an anode line.

6. A brushless motor as claimed in claim 1, wherein said one line of said power source lines is a ground line.

7. A brushless motor comprising:

a casing;

a stator secured on said casing and having an exciting coil;

a rotating shaft rotatably mounted in said casing and extending through said stator, said rotating shaft projecting from said casing;

a rotor having a hub portion secured on said rotating shaft, an umbrella portion spreading outwardly from said hub portion, a cylindrical portion depending from an outer circumferential edge of said umbrella portion, and a plurality of magnets disposed along an inner peripheral surface of said cylindrical portion, wherein said rotor is located so as to cover said stator;

a control board disposed in said casing;

a circuit and power source lines for supplying current to said circuit arranged on said control board, wherein said circuit includes a plurality of switching means for switching the direction of an electric current supplied to said exciting coil;

a fan secured on an end portion of said rotating shaft; and a heat sink secured to said casing and provided with a contact portion and a heat discharge portion, wherein said switching means contacts said contact portion, and said heat discharge portion is exposed to the exterior of said casing at a location adjacent to said fan, wherein said plurality of switching means comprises field effect transistors, each of said field effect transistors includes a drain terminal, and at least one drain terminal is electrically connected to said heat sink, so that an electrical potential of said heat sink is equal to an electrical potential of an anode line of said power source lines arranged on said control board.

8. A brushless motor as claimed in claim 7, further comprising a shorting line connected to said heat sink and to said anode line of said power source lines.

9. A brushless motor comprising:

a casing;

a stator secured on said casing and having an exciting coil;

a rotating shaft rotatably mounted in said casing and extending through said stator, said rotating shaft projecting from said casing;

a rotor having a hub portion secured on said rotating shaft, an umbrella portion spreading outwardly from said hub portion, a cylindrical portion depending from an outer circumferential edge of said umbrella portion, and a plurality of magnets disposed along an inner peripheral surface of said cylindrical portion, wherein said rotor is located so as to cover said stator;

a control board disposed in said casing;

a circuit and power source lines for supplying current to said circuit arranged on said control board, wherein said circuit includes a plurality of switching means for switching the direction of an electric current supplied to said exciting coil;

a fan secured on an end portion of said rotating shaft;

a heat sink secured to said casing and provided with a contact portion and a heat discharge portion, wherein said switching means contacts said contact portion, and said heat discharge portion is exposed to the exterior of said casing at a location adjacent to said fan; and a short circuit terminal connected to an anode line of said power source lines, said short circuit terminal being located adjacent said switching means and secured on said heat sink.

* * * * *